(12) United States Patent
Rolandson

(10) Patent No.: US 11,333,107 B2
(45) Date of Patent: *May 17, 2022

(54) VEHICLE EXHAUST GAS RECIRCULATION SYSTEM UTILIZING A LOW TEMPERATURE CIRCUIT-HIGH TEMPERATURE CIRCUIT CROSSOVER VALVE ASSEMBLY

(71) Applicant: Volvo Car Corporation, Gothenburg (SE)

(72) Inventor: Ola Rolandson, Vänersnäs (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,313

(22) Filed: Sep. 4, 2020

(65) Prior Publication Data

US 2020/0400105 A1 Dec. 24, 2020

Related U.S. Application Data

(63) Continuation of application No. 16/251,162, filed on Jan. 18, 2019, now Pat. No. 10,767,601.

(51) Int. Cl.
*F02M 26/06* (2016.01)
*F02M 26/19* (2016.01)
*F02B 29/04* (2006.01)
*F01P 3/20* (2006.01)
(Continued)

(52) U.S. Cl.
CPC ............... *F02M 26/06* (2016.02); *F01P 3/20* (2013.01); *F02B 29/0406* (2013.01); *F02B 29/0443* (2013.01); *F02M 26/19* (2016.02); *F02M 26/23* (2016.02); *F16K 11/0833* (2013.01)

(58) Field of Classification Search
CPC .. F01P 3/20; F16K 11/0833; F02M 26/22–28; F02M 26/73; F02B 29/0406; F02B 29/0043; F02B 29/0475
See application file for complete search history.

(56) References Cited

U.S. PATENT DOCUMENTS 6,044,827 A 4/2000 Pfaff et al.
6,976,480 B2 12/2005 Miyoshi et al.
7,624,575 B2 12/2009 Noelle et al.
(Continued)

FOREIGN PATENT DOCUMENTS

GB 2535996 A 9/2016

*Primary Examiner* — Laert Dounis
(74) *Attorney, Agent, or Firm* — Clements Bernard Walker; Christopher L. Bernard

(57) ABSTRACT

The exhaust gas recirculation (EGR) system provided herein utilizes a crossover (X) valve that is selectively activated at the direction of the electronic control module (ECM) to mix the high temperature (HT) and low temperature (LT) circuits of the EGR system under certain predetermined operating conditions. Thus, HT circuit fluid (at engine temperatures) is selectively fed into the LT circuit fluid (at ambient temperatures) to heat certain LT circuit components that are normally cooled by the LT circuit before starting the low pressure (LP) EGR in certain cold cycles. When this heating is finished, the X valve is closed to provide normal HT circuit/LT circuit fluid separation. The X valve can be controlled using a rotational actuator or the like. To avoid exposing the LT circuit to the high revolution-per-minute (RPM) operating conditions of the HT circuit, a HT bypass mechanism is provided.

19 Claims, 9 Drawing Sheets

(51) Int. Cl.
*F02M 26/23* (2016.01)
*F16K 11/083* (2006.01)

(56) References Cited

U.S. PATENT DOCUMENTS 8,015,809 B2    9/2011   Watson
8,925,530 B2    1/2015   Bruggesser et al.

VEHICLE EXHAUST GAS RECIRCULATION SYSTEM UTILIZING A LOW TEMPERATURE CIRCUIT-HIGH TEMPERATURE CIRCUIT CROSSOVER VALVE ASSEMBLY

CROSS-REFERENCE TO RELATED APPLICATION

The present disclosure is a continuation of U.S. patent application Ser. No. 16/251,162, filed on Jan. 18, 2019, and entitled "VEHICLE EXHAUST GAS RECIRCULATION SYSTEM UTILIZING A LOW TEMPERATURE CIRCUIT-HIGH TEMPERATURE CIRCUIT CROSSOVER VALVE ASSEMBLY," the contents of which are incorporated in full by reference herein.

TECHNICAL FIELD

The present invention relates generally to the automotive field. More specifically, the present invention relates to a vehicle exhaust gas recirculation (EGR) system utilizing a low temperature (LT) circuit-high temperature (HT) circuit crossover (X) valve assembly to selectively avoid condensation in the exhaust gases recirculated to the associated turbocharger compressor inlet, thereby avoiding subsequent compressor component damage.

BACKGROUND

As fuel efficiency and emissions concerns become increasingly important, more and more vehicles are being equipped with turbochargers utilizing exhaust gas recirculation (EGR) systems. EGR systems increase the fuel efficiency of an internal combustion (IC) engine and reduce the emissions of noxious exhaust gases by recirculating a portion of the unused fuel and exhaust gases back to the engine for subsequent use, instead of releasing them into the environment. In a low pressure (LP) EGR system, the exhaust gases are reintroduced to the engine just upstream of the turbocharger compressor, at the turbocharger compressor inlet. At this location, the pressure is low, even under high engine boost conditions. This solves some of the quality issues associated with related high pressure (HP) EGR systems.

As illustrated in FIG. 1, EGR gases are mixed with conventional inlet air just before entering the turbocharger compressor. The ratio of EGR gases to inlet air determines the efficiency of the EGR system and engine overall. The utilization of EGR gases, however, is often limited by the condensation of water droplets in the EGR gases near the mixing point as the hot, humid EGR gases are cooled by the cool, dry inlet air. This cooling usually occurs through (and condensation usually occurs on and adjacent to) the wall that divides the hot, humid EGR gases from the cool, dry inlet air just prior to the mixing point, in the hot, humid EGR gases. This problem is especially pronounced under cold start and low temperature operating conditions, sometimes delaying the normal activation of the EGR system. This can compromise emissions testing results, for example, and otherwise degrade engine performance. In a worst case scenario, under extreme conditions, ice particles can even be formed in the EGR gases, exacerbating these issues.

Problematically, the condensed water droplets (or ice particles) near the mixing point of the EGR gases and the inlet air are fed directly to the turbocharger compressor. These water droplets (or ice particles) can impact the turbocharger compressor wheel, blades, and other components, damaging them. As illustrated in FIG. 2, the water droplets initially exert a force perpendicular to the component surface, which causes a blast wave upon component surface contact, resulting in a force exerted parallel to the component surface. This force exerted parallel to the component surface can impinge upon surface imperfections, causing spalls, cracks, etc. at or near such surface imperfections.

Thus, what is still needed in the art is an EGR system that inhibits the condensation of water droplets and the formation of ice particles near the mixing point of the associated EGR gases and inlet air, and especially on and adjacent to the wall separating the EGR gases from the inlet air, such that the subsequent turbocharger compressor wheel, blades, and other components are not damaged by the condensed water droplets or formed ice particles. One way this can be done is through the selective high temperature (HT) circuit heating of low temperature (LT) circuit components (e.g., the water-cooled charge air cooler (WCAC), compressor, selective catalytic reducer (SCR), etc.) that are normally cooled by the LT circuit before starting the LP EGR in certain cold cycles. This circuit shifting can be controlled by an electronic control module (ECM) to target a setpoint temperature that avoids condensation risks at subzero conditions, for example.

SUMMARY

Accordingly, the exhaust gas recirculation (EGR) system provided herein utilizes a crossover (X) valve that is selectively activated at the direction of the electronic control module (ECM) to mix the high temperature (HT) and low temperature (LT) circuits of the EGR system under certain predetermined operating conditions. Thus, HT circuit fluid (at engine temperatures) is selectively fed into the LT circuit fluid (at ambient temperatures) to heat certain LT circuit components (e.g., the water-cooled charge air cooler (WCAC), compressor, selective catalytic reducer (SCR), etc.) that are normally cooled by the LT circuit before starting the low pressure (LP) EGR in certain cold cycles. When this heating is finished, the X valve is closed to provide normal HT circuit/LT circuit fluid separation. In operation, the fixed displacement HT pump flow curve follows engine revolutions-per-minute (RPM), while the electrical LT pump flow curve follows a software algorithm incorporating a temperature model. The X valve can be controlled using a rotational actuator or the like that is coupled to the X valve and ultimately actuated by the ECM. To avoid exposing the LT circuit to the high RPM operating conditions of the HT circuit, in addition to electrical LT pump flow curve control, a HT bypass mechanism is provided.

The X valve provided herein effectively inhibits the condensation of water droplets and the formation of ice particles near and at the mixing point of the EGR gases and inlet air in the upstream proximity of the compressor inlet, such that the turbocharger compressor wheel, blades, and other components are not subsequently damaged by the condensed water droplets or formed ice particles. This inhibition can be targeted to certain known problematic operating conditions.

In one exemplary embodiment, the vehicle exhaust gas recirculation (EGR) system provided herein includes: a high temperature (HT) circuit adapted to circulate a relatively higher temperature fluid within the EGR system; a low temperature (LT) circuit adapted to circulate a relatively lower temperature fluid within the EGR system; and means for selectively mixing all or a portion of the relatively higher temperature fluid of the HT circuit with the relatively lower temperature fluid of the LT circuit fluidly coupled to both the HT circuit and the LT circuit.

In another exemplary embodiment, the crossover (X) valve assembly for the vehicle exhaust gas recirculation (EGR) system provided herein includes: a valve housing; a low temperature (LT) inlet port fluidly coupled to the housing; a LT outlet port fluidly coupled to the housing, the LT inlet port and the LT outlet port forming a portion of a LT circuit adapted to circulate a relatively lower temperature fluid within the EGR system; a high temperature (HT) inlet port fluidly coupled to the housing; a HT outlet port fluidly coupled to the housing, the HT inlet port and the HT outlet port forming a portion of a HT circuit adapted to circulate a relatively higher temperature fluid within the EGR system; and an inner wall disposed within the valve housing adapted to be actuated from an inactive configuration in which the LT inlet port is fluidly coupled to the LT outlet port through a LT chamber defined within the valve housing and the HT inlet port is fluidly coupled to the HT outlet port through a HT chamber defined within the valve housing and an active configuration in which the HT inlet port is fluidly coupled to the LT outlet port through a first mixing chamber defined within the valve housing and the LT inlet port is fluidly coupled to the HT outlet port through a second mixing chamber defined within the valve housing.

In a further exemplary embodiment, the computer program product provided herein includes a non-transitory computer readable medium having instructions stored thereon and executed to cause a computer to: obtain an operating state of a vehicle; and, based on the obtained operating state of the vehicle, selectively actuate a valve assembly fluidly coupled to a high temperature (HT) circuit adapted to circulate a relatively higher temperature fluid within an exhaust gas recirculation (EGR) system and a low temperature (LT) circuit adapted to circulate a relatively lower temperature fluid within the EGR system, actuating the valve assembly causing all or a portion of the relatively higher temperature fluid of the HT circuit to mix with the relatively lower temperature fluid of the LT circuit.

BRIEF DESCRIPTION OF THE DRAWINGS

The present invention is illustrated and described herein with reference to the various drawings, in which like reference numbers are used to denote like system or assembly components/method or algorithm steps, as appropriate, and in which.

DESCRIPTION OF EMBODIMENTS

Again, the exhaust gas recirculation (EGR) system provided herein utilizes a crossover (X) valve that is selectively activated at the direction of the electronic control module (ECM) to mix the high temperature (HT) and low temperature (LT) circuits of the EGR system under certain predetermined operating conditions. Thus, HT circuit fluid (at engine temperatures) is selectively fed into the LT circuit fluid (at ambient temperatures) to heat certain LT circuit components (e.g., the water-cooled charge air cooler (WCAC), compressor, selective catalytic reducer (SCR), etc.) that are normally cooled by the LT circuit before starting the low pressure (LP) EGR in certain cold cycles. When this heating is finished, the X valve is closed to provide normal HT circuit/LT circuit fluid separation. In operation, the fixed displacement HT pump flow curve follows engine revolutions-per-minute (RPM), while the electrical LT pump flow curve follows a software algorithm incorporating a temperature model. The X valve can be controlled using a rotational actuator or the like that is coupled to the X valve and ultimately actuated by the ECM. To avoid exposing the LT circuit to the high RPM operating conditions of the HT circuit, in addition to electrical LT pump flow curve control, a HT bypass mechanism is provided.

The X valve provided herein effectively inhibits the condensation of water droplets and the formation of ice particles near and at the mixing point of the EGR gases and inlet air in the upstream proximity of the compressor inlet, such that the turbocharger compressor wheel, blades, and other components are not subsequently damaged by the condensed water droplets or formed ice particles. This inhibition can be targeted to certain known problematic operating conditions.

Figure 1:
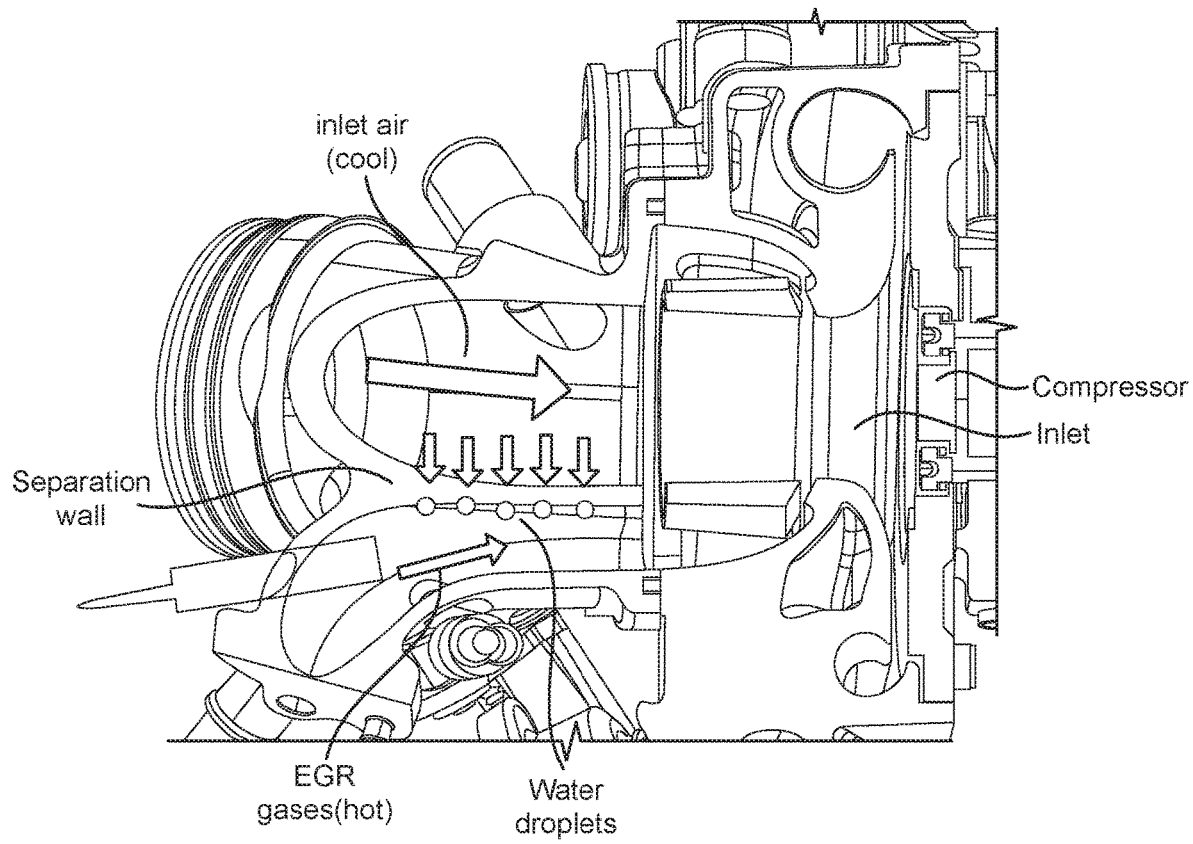
FIG. 1 is a cut-away perspective view of a conventional ported shroud and compressor inlet area of an EGR system, highlighting the problematic condensation of water droplets near the mixing point of the associated EGR gases and inlet air.
Figure 2:
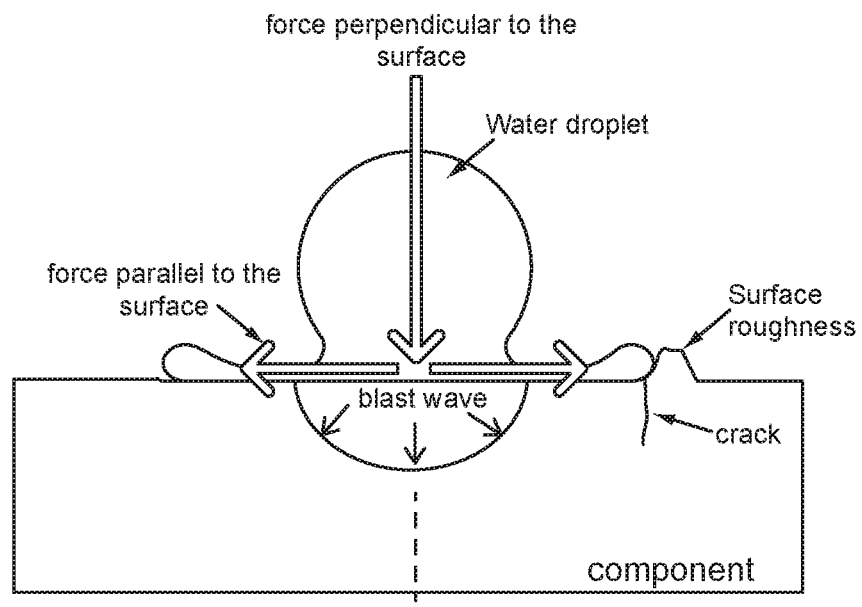
FIG. 2 is a schematic diagram illustrating the mechanism by which condensed water droplets can damage a turbocharger compressor component.
Figure 3:
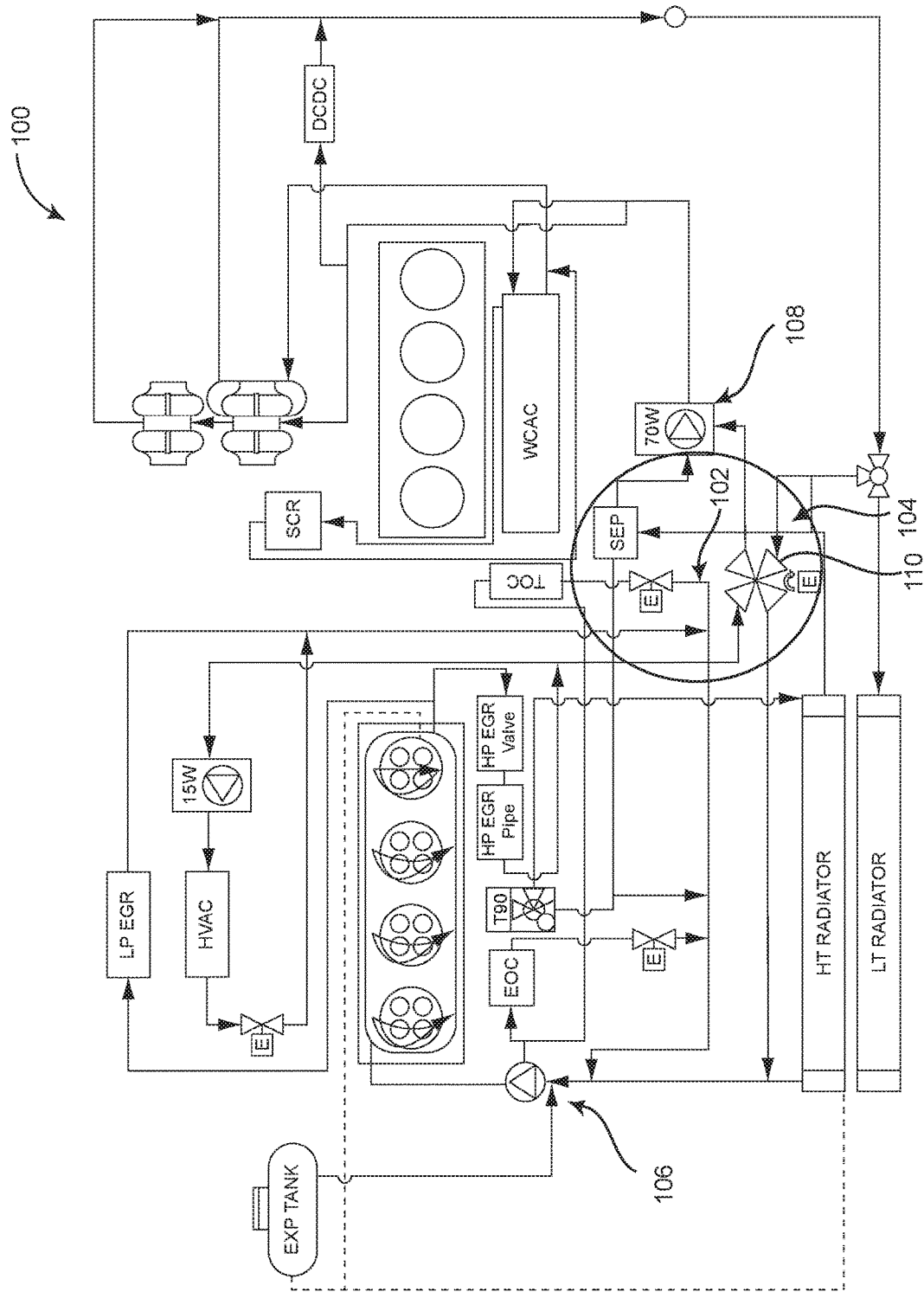
FIG. 3 is a schematic diagram illustrating one exemplary embodiment of the EGR system provided herein, allowing for selective crossover of the HT and LT circuits for the selective heating of LT circuit components.

Referring now specifically to FIG. 3, in one exemplary embodiment, the EGR system 100 provided herein includes a HT circuit 102 that circulates a fluid at roughly engine temperatures and a LT circuit 104 that circulates a fluid at roughly ambient temperatures. The HT circuit 102 includes a fixed displacement pump 106 that utilizes a flow curve that is defined by engine operating RPM. The LT circuit 104 includes an electrical pump 108 that is software controlled, using a temperature model that, in part, dictates the operation described herein. Other components of the HT circuit 102 and the LT circuit 104, and the EGR system 100 in general, are well known to those of ordinary skill in the art and are not described in greater detail herein. The EGR system 100 incorporates a X valve 110 that selectively intermingles the HT circuit 102 with the LT circuit 104, with HT fluid being added to the LT fluid to selectively heat various components (e.g., the water-cooled charge air cooler (WCAC), compressor, selective catalytic reducer (SCR), etc.) of the LT circuit 104. When this heating process is finished and no longer needed, the X valve 110 effectively separates the HT circuit 102 and the LT circuit 104, as normal. As alluded to herein above, to avoid exposing the LT circuit 104 to the high RPM operating conditions of the HT circuit 102, in addition to electrical LT pump flow curve control, a HT bypass mechanism is optionally provided.

Figure 4:
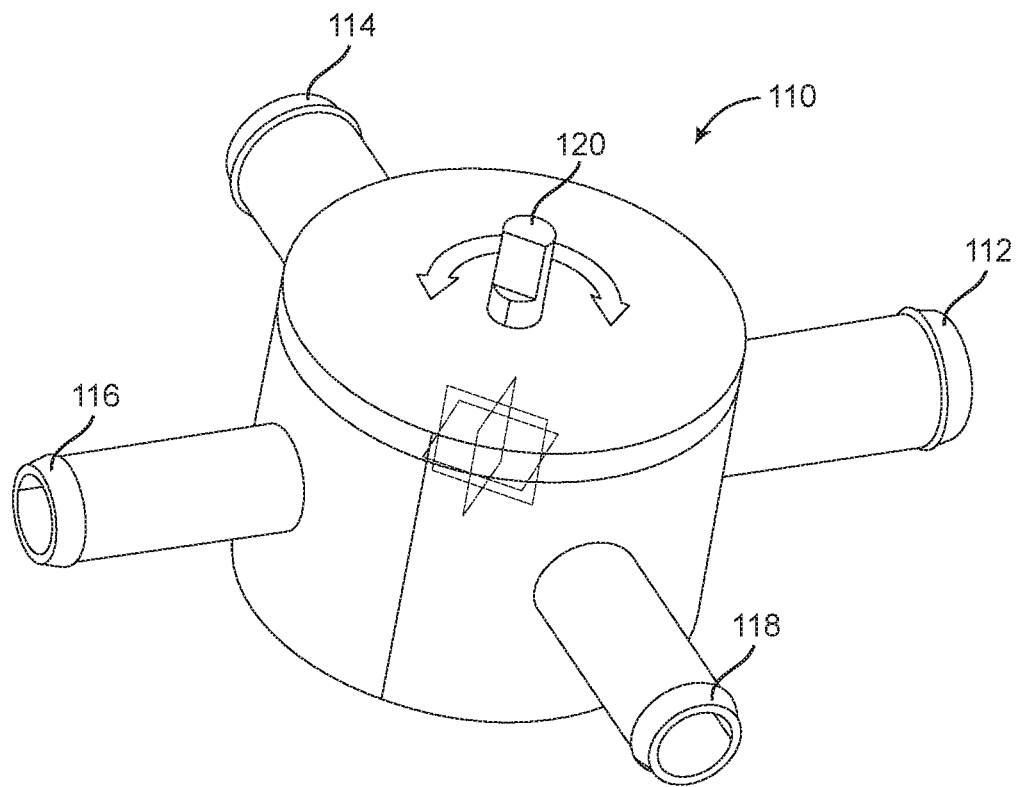
FIG. 4 is a perspective view of one exemplary embodiment of the X valve provided herein and used in the EGR system of FIG. 3.

Referring now specifically to FIG. 4, the X-valve 110 provided herein is a 4-port rotational valve assembly or the like, including a LT inlet port 112, a LT outlet port 114, a HT inlet port 116, and a HT outlet port 118. In an inactive configuration, the X-valve separates the LT ports 112, 114 from the HT ports 116, 118, while providing through paths for the appropriate LT circuit 102 (FIG. 3) or HT circuit 104 (FIG. 3). In an active configuration, the X-valve 110 allows some of the higher pressure HT fluid to infiltrate the LT fluid. The X valve 110 is controlled using a rotational actuator 120 or the like that is coupled to the X valve 110 and ultimately actuated by the ECM (not illustrated). In general, the 4-port rotational valve assembly or the like is conventional in that it includes a housing and an internal flow diverting structure, as is described in greater detail herein below. To avoid exposing the LT circuit 104 to the high RPM operating conditions of the HT circuit 102, in addition to electrical LT pump flow curve control, a HT bypass mechanism, also described in greater detail herein below, is optionally provided. Not only does this HT bypass mechanism safeguard the LT circuit 104, it also limits the increased load on the HT pump 106 (FIG. 3).

Figure 5:
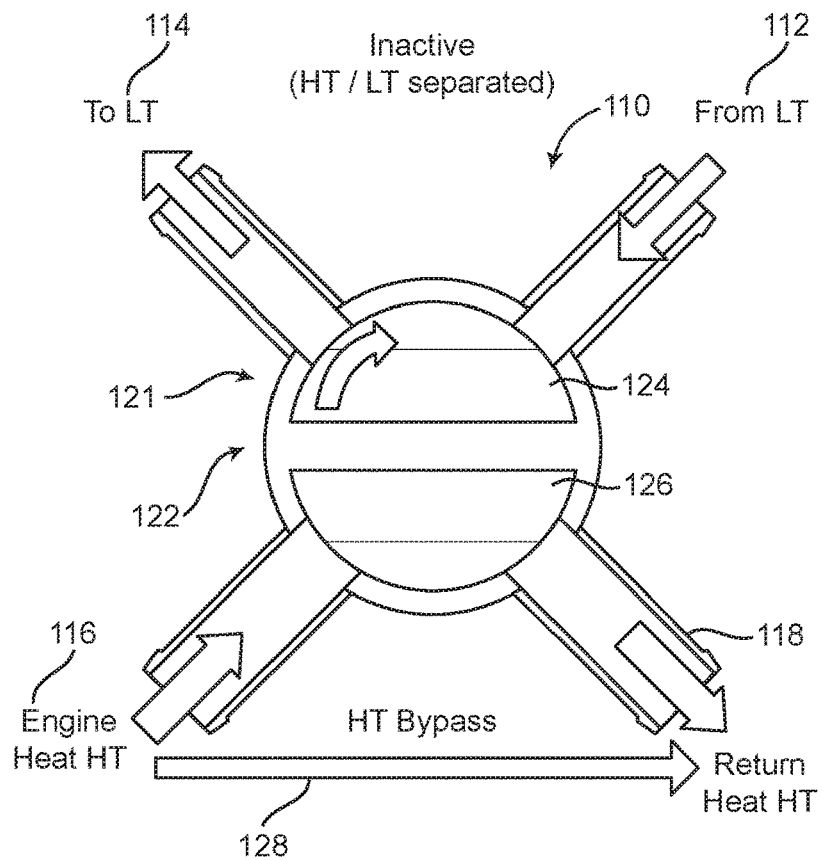
FIG. 5 is a series of schematic diagrams illustrating one exemplary operation method of the X valve of FIG. 4, incorporating an external HT circuit bypass.
Figure 5:
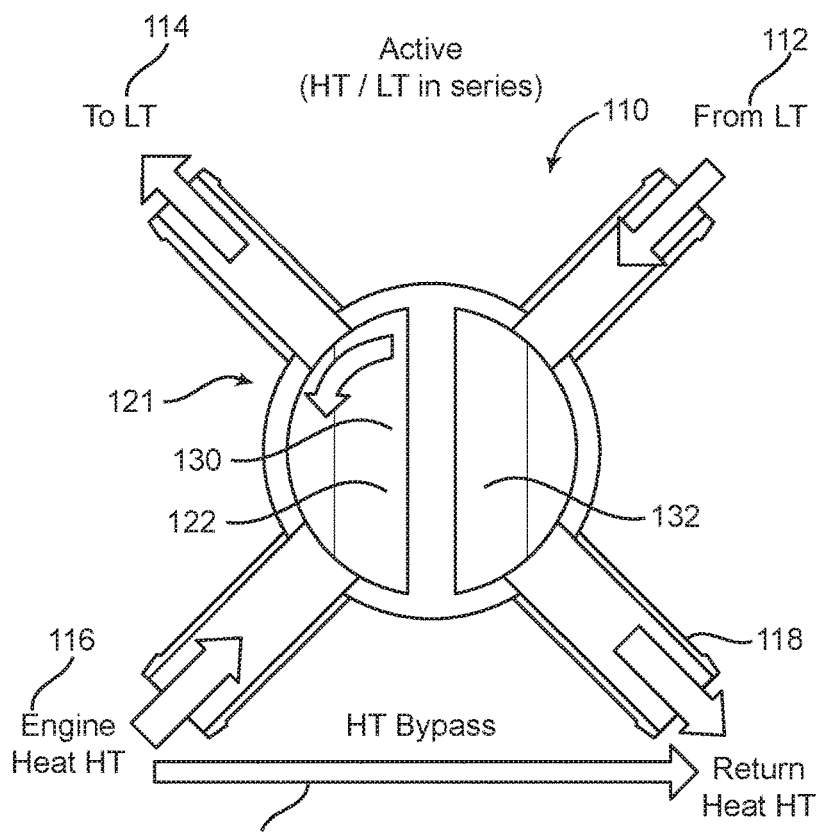

Referring now specifically to FIG. 5, in one exemplary embodiment, in an inactive configuration, the X valve 110 separates the LT circuit 104 (FIG. 3) from the HT circuit 102 (FIG. 3) by providing a LT flow chamber 124 within the valve housing 121. The LT flow chamber 124 couples the LT inlet port 112 and the LT outlet port 114. The X valve 110 provides a HT flow chamber 126 within the valve housing 121 that couples the HT inlet port 116 and the HT outlet port 118. The LT flow chamber 124 is separated from the HT flow chamber 126 by an inner wall 122 or comparable mechanism. In this exemplary embodiment, the inner wall 122 is rotationally deployed. An external HT bypass 128 is provided that shunts a portion of the HT fluid around the X valve 110 at all times, thereby maintaining a HT fluid flow and limiting over-pressurization of the LT circuit 104. In an active configuration, in this exemplary embodiment, the inner wall 122 is rotated approximately 90 degrees to form a first mixing chamber 130 within the valve housing 121 that provides some of the HT fluid from the HT inlet port 116 to the LT outlet port 114, thereby heating the LT circuit 104. The inner wall 122 also forms a second mixing chamber 132 within the valve housing 121 that provides all of the LT fluid from the LT inlet port 112 to the HT outlet port 118, thereby cooling the HT circuit 102. Again, the external HT bypass 128 is provided that shunts a portion of the HT fluid around the X valve 110 at all times, thereby maintaining a HT fluid flow and limiting over-pressurization of the LT circuit 104.

Figure 6:
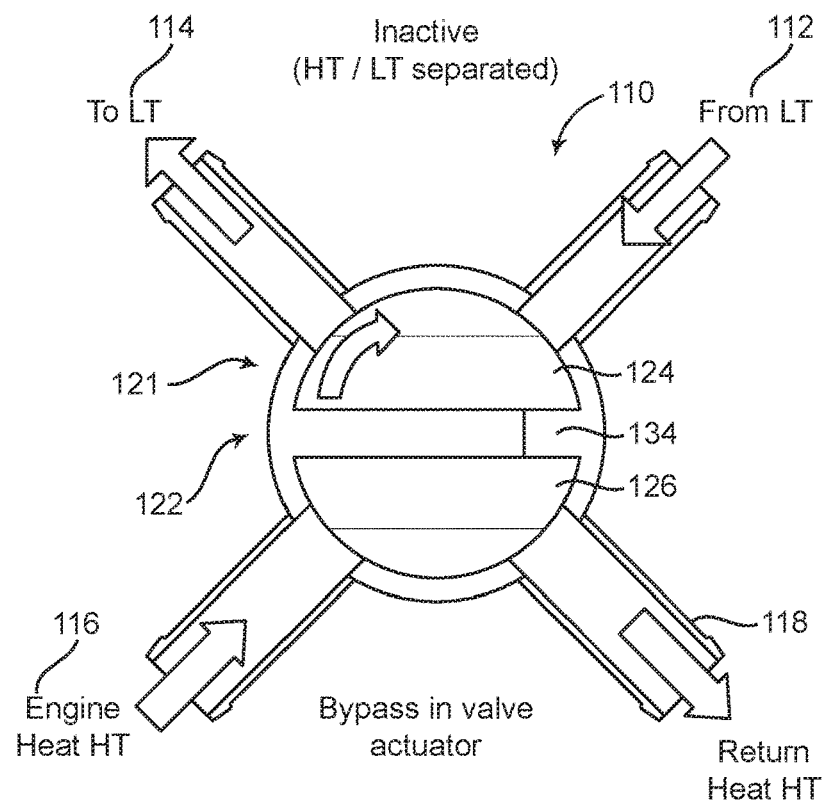
FIG. 6 is a series of schematic diagrams illustrating another exemplary operation method of the X valve of FIG. 4, incorporating an internal HT circuit bypass.
Figure 6:
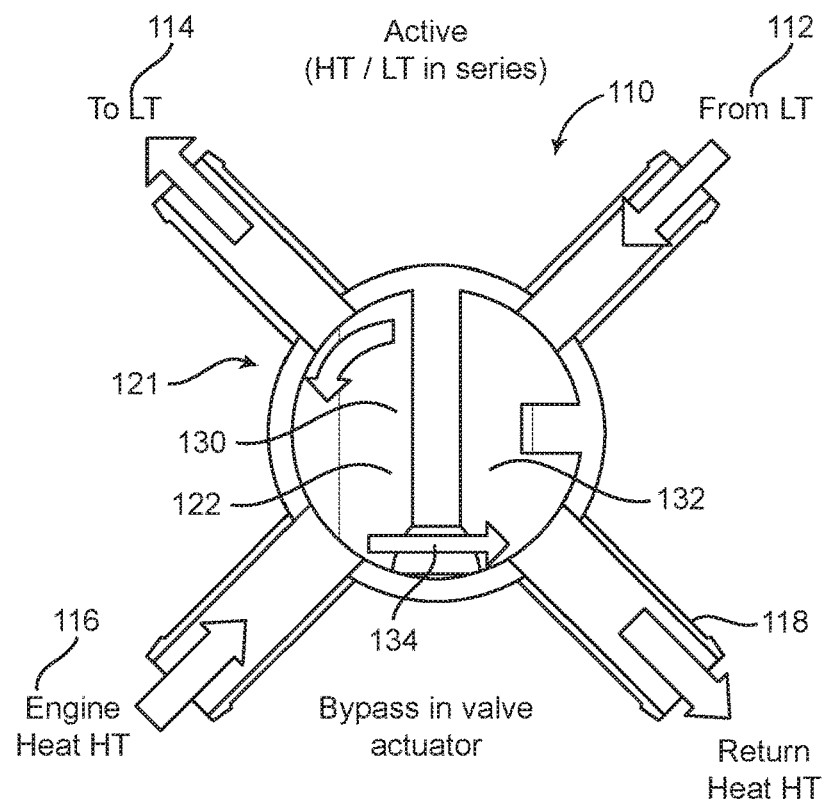

Referring now specifically to FIG. 6, in another exemplary embodiment, in an inactive configuration, the X valve 110 separates the LT circuit 104 (FIG. 3) from the HT circuit 102 (FIG. 3) by providing a LT flow chamber 124 within the valve housing 121. The LT flow chamber 124 couples the LT inlet port 112 and the LT outlet port 114. The X valve 110 provides a HT flow chamber 126 within the valve housing 121 that couples the HT inlet port 116 and the HT outlet port 118. The LT flow chamber 124 is separated from the HT flow chamber 126 by an inner wall 122 or comparable mechanism. In this exemplary embodiment, the inner wall 122 is rotationally deployed. An internal HT bypass 134 is provided that shunts a portion of the HT fluid around the LT circuit 104 within the valve housing 121 when the X-valve 110 is actuated, thereby maintaining a HT fluid flow and limiting over-pressurization of the LT circuit 104. In an active configuration, in this exemplary embodiment, the inner wall 122 is rotated approximately 90 degrees to form a first mixing chamber 130 within the valve housing 121 that provides some of the HT fluid from the HT inlet port 116 to the LT outlet port 114, thereby heating the LT circuit 104. The inner wall 122 also forms a second mixing chamber 132 within the valve housing 121 that provides all of the LT fluid from the LT inlet port 112 to the HT outlet port 118, thereby cooling the HT circuit 102. Again, the internal HT bypass 134 is provided that shunts a portion of the HT fluid around the LT circuit 104 within the valve housing 121 when the X-valve 110 is actuated, thereby maintaining a HT fluid flow and limiting over-pressurization of the LT circuit 104. In this exemplary embodiment, the internal HT bypass 134 is formed via a 2-piece inner wall 122. The inner wall 122 is intact in the inactive configuration, but is split into two pieces in the active configuration, with one piece of the inner wall 122 rotating as described, and another piece of the inner wall 122 remaining in its original position. This effectively forms the internal HT bypass 134, as two HT paths are provided, one to the LT outlet port 114 through the first mixing chamber 130 and one to the HT outlet port 118 through the inner wall 122.

Figure 7:
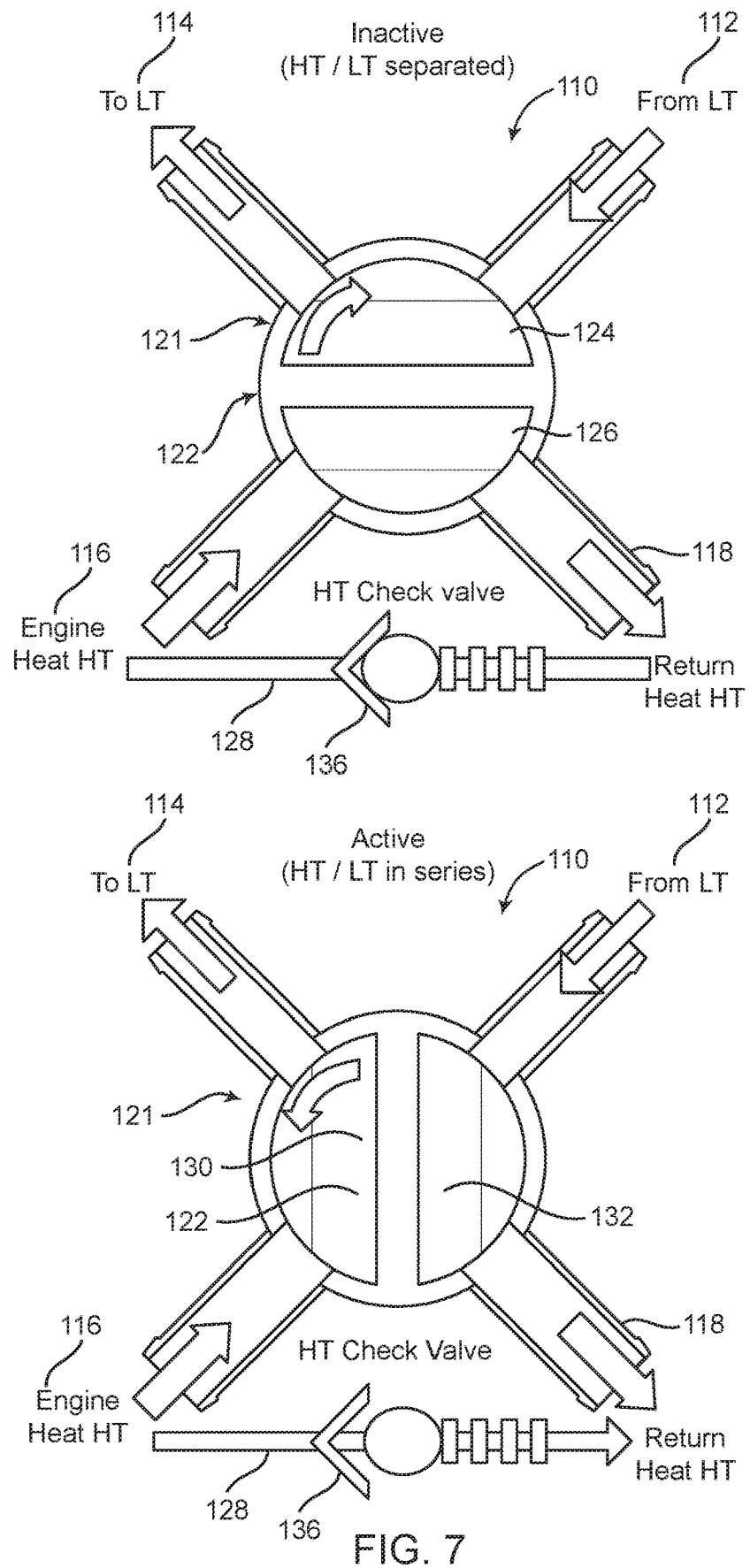
FIG. 7 is a series of schematic diagrams illustrating a further exemplary operation method of the X valve of FIG. 4, incorporating an external HT circuit bypass utilizing a check valve.

Referring now specifically to FIG. 7, in a further exemplary embodiment, in an inactive configuration, the X valve 110 separates the LT circuit 104 (FIG. 3) from the HT circuit 102 (FIG. 3) by providing a LT flow chamber 124 within the valve housing 121. The LT flow chamber 124 couples the LT inlet port 112 and the LT outlet port 114. The X valve 110 provides a HT flow chamber 126 within the valve housing 121 that couples the HT inlet port 116 and the HT outlet port 118. The LT flow chamber 124 is separated from the HT flow chamber 126 by an inner wall 122 or comparable mechanism. In this exemplary embodiment, the inner wall 122 is rotationally deployed. An external HT bypass 128 is provided that shunts a portion of the HT fluid around the X valve 110, thereby maintaining a HT fluid flow and limiting over-pressurization of the LT circuit 104. The external HT bypass 128 incorporates a check valve 136 or the like, described in greater detail herein below. In an active configuration, in this exemplary embodiment, the inner wall 122 is rotated approximately 90 degrees to form a first mixing chamber 130 within the valve housing 121 that provides some of the HT fluid from the HT inlet port 116 to the LT outlet port 114, thereby heating the LT circuit 104. The inner wall 122 also forms a second mixing chamber 132 within the valve housing 121 that provides all of the LT fluid from the LT inlet port 112 to the HT outlet port 118, thereby cooling the HT circuit 102. Again, the external HT bypass 128 is provided that shunts a portion of the HT fluid around the X valve 110, thereby maintaining a HT fluid flow and limiting over-pressurization of the LT circuit 104. The external HT bypass 128 incorporates a check valve 136 or the like. This check valve 136 ensures that the HT circuit 102 feeds LT circuit 104 at low mass flows, when 100% of the heated mass flow is diverted to heat the LT circuit 104. The check valve 136 open to manage high mass flows, when the pressure exceeds the check valve pressure, thus avoiding cavitation and HT pump issues.

Figure 8:
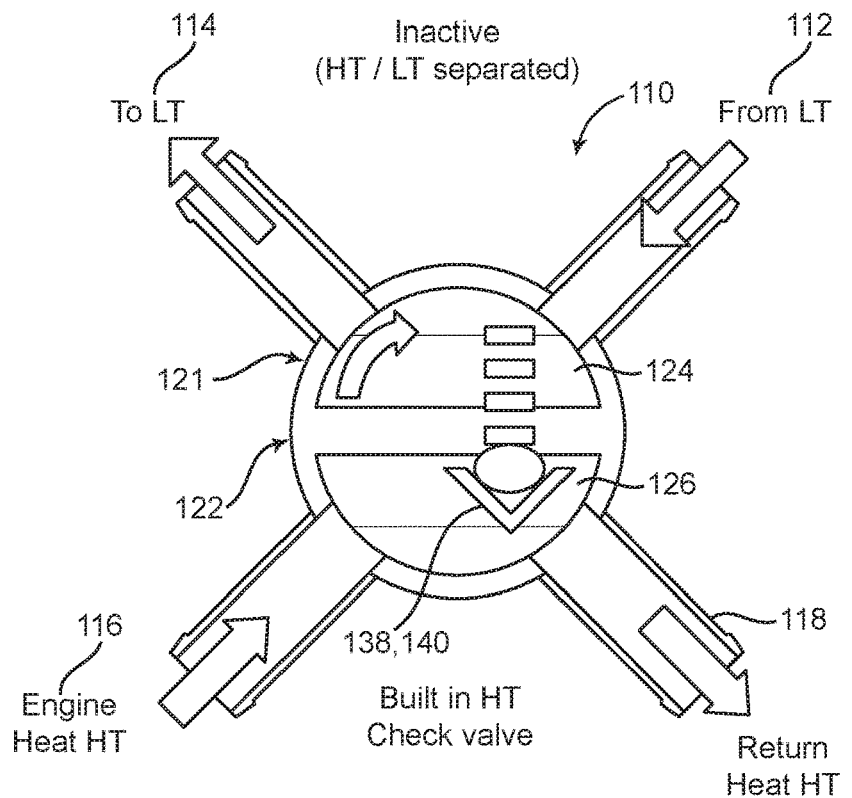
FIG. 8 is a series of schematic diagrams illustrating a still further exemplary operation method of the X valve of FIG. 4, incorporating an internal HT circuit bypass utilizing a check valve.
Figure 8:
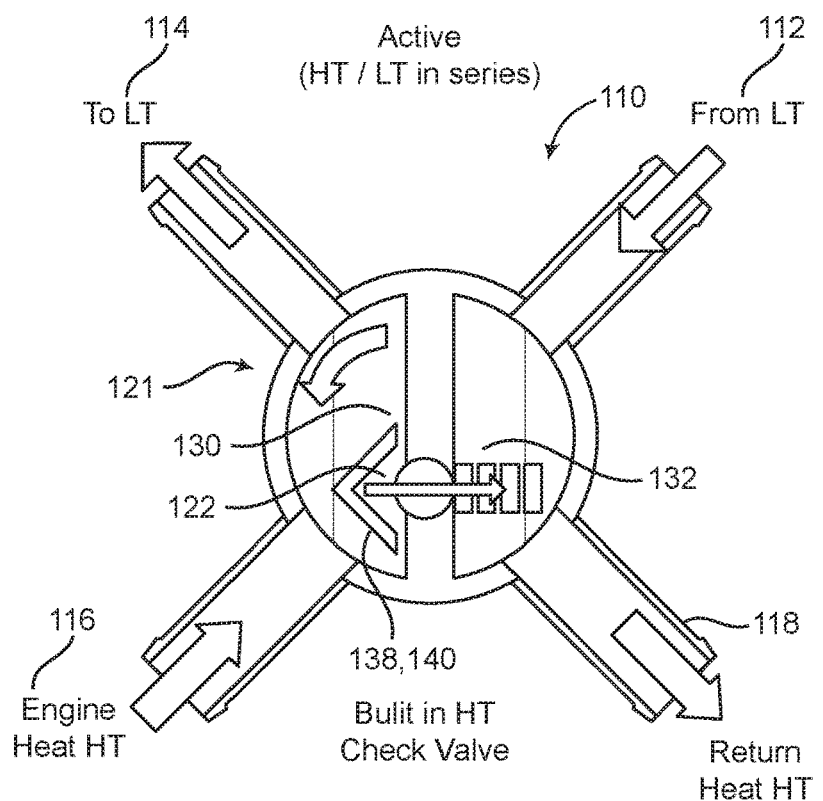

Referring now specifically to FIG. 8, in a still further exemplary embodiment, in an inactive configuration, the X valve 110 separates the LT circuit 104 (FIG. 3) from the HT circuit 102 (FIG. 3) by providing a LT flow chamber 124 within the valve housing 121. The LT flow chamber 124 couples the LT inlet port 112 and the LT outlet port 114. The X valve 110 provides a HT flow chamber 126 within the valve housing 121 that couples the HT inlet port 116 and the HT outlet port 118. The LT flow chamber 124 is separated from the HT flow chamber 126 by an inner wall 122 or comparable mechanism. In this exemplary embodiment, the inner wall 122 is rotationally deployed. An internal HT bypass 138 is built into the inner wall 122 that shunts a portion of the HT fluid around the LT circuit 104, thereby maintaining a HT fluid flow and limiting over-pressurization of the LT circuit 104. The internal HT bypass 138 incorporates a check valve 140 or the like, described in greater detail herein below. In an active configuration, in this exemplary embodiment, the inner wall 122 is rotated approximately 90 degrees to form a first mixing chamber 130 within the valve housing 121 that provides some of the HT fluid from the HT inlet port 116 to the LT outlet port 114, thereby heating the LT circuit 104. The inner wall 122 also forms a second mixing chamber 132 within the valve housing 121 that provides all of the LT fluid from the LT inlet port 112 to the HT outlet port 118, thereby cooling the HT circuit 102. Again, the internal HT bypass 138 is is built into the inner wall 122 that shunts a portion of the HT fluid around the LT circuit 104, thereby maintaining a HT fluid flow and limiting over-pressurization of the LT circuit 104. The internal HT bypass 138 incorporates a check valve 140 or the like. This check valve 140 ensures that the HT circuit 102 feeds LT circuit 104 at low mass flows, when 100% of the heated mass flow is diverted to heat the LT circuit 104. The check valve 140 open to manage high mass flows, when the pressure exceeds the check valve pressure, thus avoiding cavitation and HT pump issues.

Figure 9:
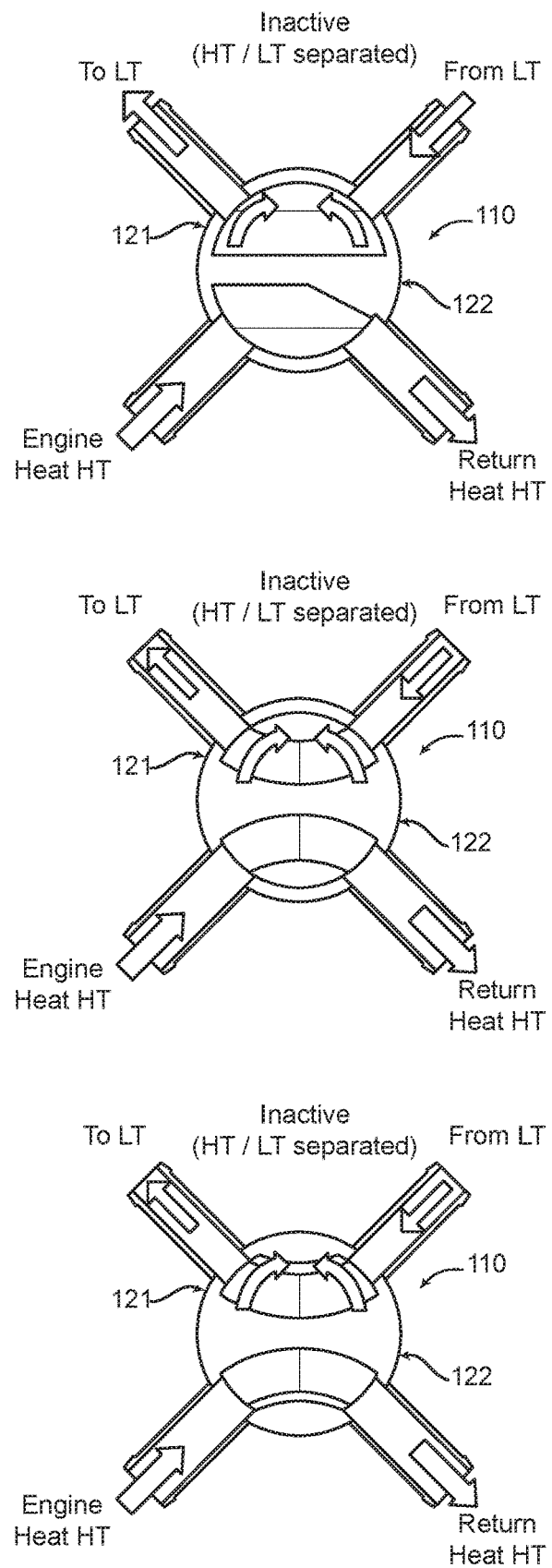
FIG. 9 is a series of schematic diagrams illustrating a still further exemplary operation method of the X valve of FIG. 4, highlighting the use of different valve body configurations to regulate the flow transition between the HT and LT circuits.

As illustrated in FIG. 9, the shape of the interior of the valve housing 121 and inner wall 122 can be varied to tailor the flows associated with the HT circuit 102 (FIG. 3) and the LT circuit 104 (FIG. 3) within the X valve 110. For example, the inner wall 122 can have one or more thickened and/or angled portions, the inner wall 122 can have one or more concave/convex surfaces, and/or the interior of the valve housing 121 and/or inner wall 122 can define one or more discrete fluid flow channels. All of these features help to define fluid flow volume and velocity, as well as degree of HT/LT mixing, avoiding turbulence.

The software algorithm contemplated herein determines the desired operating state of the associated vehicle and adjusts the HT/LT mix as appropriate, in accordance with the description herein. Preferably, the software algorithm is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, sensors, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Again, the X valve and methodologies provided herein effectively inhibits the condensation of water droplets and the formation of ice particles near and at the mixing point of the EGR gases and inlet air in the upstream proximity of the compressor inlet, such that the turbocharger compressor wheel, blades, and other components are not subsequently damaged by the condensed water droplets or formed ice particles. This inhibition can be targeted to certain known problematic operating conditions.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. An exhaust gas recirculation (EGR) system for a vehicle, the EGR system comprising:
   a high temperature (HT) circuit adapted to circulate a relatively higher temperature fluid within the EGR system;
   a low temperature (LT) circuit adapted to circulate a relatively lower temperature fluid within the EGR system; and
   a crossover (X) valve assembly adapted to selectively mix all or a portion of the relatively higher temperature fluid of the HT circuit with the relatively lower temperature fluid of the LT circuit fluidly coupled to both the HT circuit and the LT circuit, wherein the X valve assembly comprises a valve housing encompassing an inner wall adapted to define, in an active configuration, a first mixing chamber fluidly coupling a HT inlet port to a LT outlet port of the valve housing and a second mixing chamber fluidly coupling a LT inlet port to a HT outlet port of the valve housing, and wherein the X valve assembly comprises a HT bypass mechanism adapted to bypass a portion of the relatively higher temperature fluid of the HT circuit around or through the X valve assembly from the HT inlet port to the HT outlet port of the valve housing.

2. The EGR system of claim 1, wherein the HT circuit comprises a fixed displacement HT pump adapted to operate with a flow curve that follows engine revolutions-per-minute (RPM).

3. The EGR system of claim 1, wherein the LT circuit comprises an electrical LT pump adapted to operate with a flow curve that follows a vehicle operating temperature model.

4. The EGR system of claim 1, wherein the X valve assembly is adapted to be rotationally actuated by an electronic control module (ECM) of the vehicle.

5. The EGR system of claim 1, wherein the HT bypass mechanism comprises a check valve adapted to bypass the portion of the relatively higher temperature fluid of the HT circuit around or through the X valve assembly based on a mass flow rate of the relatively higher temperature fluid.

6. The EGR system of claim 1, wherein the inner wall of the X valve assembly has a variable thickness.

7. The EGR system of claim 1, wherein the inner wall of the X valve assembly comprises one or more of an angled surface, a concave surface, and a convex surface.

8. A crossover (X) valve assembly for a vehicle exhaust gas recirculation (EGR) system, the X valve assembly comprising:
a valve housing;
a low temperature (LT) inlet port fluidly coupled to the housing;
a LT outlet port fluidly coupled to the housing, the LT inlet port and the LT outlet port forming a portion of a LT circuit adapted to circulate a relatively lower temperature fluid within the EGR system;
a high temperature (HT) inlet port fluidly coupled to the housing;
a HT outlet port fluidly coupled to the housing, the HT inlet port and the HT outlet port forming a portion of a HT circuit adapted to circulate a relatively higher temperature fluid within the EGR system;
an inner wall disposed within the valve housing adapted to be actuated to an active configuration in which the HT inlet port is fluidly coupled to the LT outlet port through a first mixing chamber defined within the valve housing and the LT inlet port is fluidly coupled to the HT outlet port through a second mixing chamber defined within the valve housing; and
a HT bypass mechanism disposed adjacent to the valve housing or through the inner wall and adapted to bypass a portion of the relatively higher temperature fluid of the HT circuit around or through the valve housing from the HT inlet port to the HT outlet port.

9. The X valve assembly of claim 8, wherein the inner wall is adapted to be rotationally actuated by an electronic control module (ECM) of a vehicle.

10. The X valve assembly of claim 8, wherein the HT bypass mechanism disposed adjacent to the valve housing or through the inner wall comprises a check valve adapted to bypass the portion of the relatively higher temperature fluid of the HT circuit around or through the valve housing based on a mass flow rate of the relatively higher temperature fluid.

11. The X valve assembly of claim 8, wherein the inner wall has a variable thickness.

12. The X valve assembly of claim 8, wherein the inner wall comprises one or more of an angled surface, a concave surface, and a convex surface.

13. A computer program product including a non-transitory computer readable medium having instructions stored thereon and executed to cause a computer to:
obtain an operating state of a vehicle; and
based on the obtained operating state of the vehicle, selectively actuate a valve assembly fluidly coupled to a high temperature (HT) circuit adapted to circulate a relatively higher temperature fluid within an exhaust gas recirculation (EGR) system and a low temperature (LT) circuit adapted to circulate a relatively lower temperature fluid within the EGR system, actuating the valve assembly causing all or a portion of the relatively higher temperature fluid of the HT circuit to mix with the relatively lower temperature fluid of the LT circuit;
wherein the valve assembly comprises a crossover (X) valve assembly fluidly coupled to both the HT circuit and the LT circuit, wherein the X valve assembly comprises a valve housing encompassing an inner wall adapted to define, in an active configuration, a first mixing chamber fluidly coupling a HT inlet port to a LT outlet port of the valve housing and a second mixing chamber fluidly coupling a LT inlet port to a HT outlet port of the valve housing, and wherein the X valve assembly comprises a HT bypass mechanism adapted to bypass a portion of the relatively higher temperature fluid of the HT circuit around or through the X valve assembly from the HT inlet port to the HT outlet port of the valve housing.

14. The computer program product of claim 13, wherein the instructions are further executed to cause the computer to, based on the obtained operating state of the vehicle, modify a flow of the relatively lower temperature fluid using an electrical LT pump that is fluidly coupled to the LT circuit.

15. The computer program product of claim 13, wherein the X valve assembly is adapted to be rotationally actuated.

16. The computer program product of claim 13, wherein the HT bypass mechanism comprises a check valve adapted to bypass the portion of the relatively higher temperature fluid of the HT circuit around or through the X valve assembly based on a mass flow rate of the relatively higher temperature fluid.

17. The computer program product of claim 13, wherein the instructions are further executed to cause the computer to:
obtain a subsequent operating state of the vehicle; and
based on the obtained subsequent operating state of the vehicle, selectively subsequently actuate the valve assembly fluidly coupled to the HT circuit adapted to circulate the relatively higher temperature fluid within the EGR system and the LT circuit adapted to circulate the relatively lower temperature fluid within the EGR system, subsequently actuating the valve assembly causing the relatively higher temperature fluid of the HT circuit to be separated from the relatively lower temperature fluid of the LT circuit.

18. The computer program product of claim 13, wherein the inner wall of the X valve assembly has a variable thickness.

19. The computer program product of claim 13, wherein the inner wall of the X valve assembly comprises one or more of an angled surface, a concave surface, and a convex surface.

\* \* \* \* \*